K. W. BARTLETT.
LIQUID TREATING APPARATUS.
APPLICATION FILED JUNE 27, 1910.
1,011,399.
Patented Dec. 12, 1911.
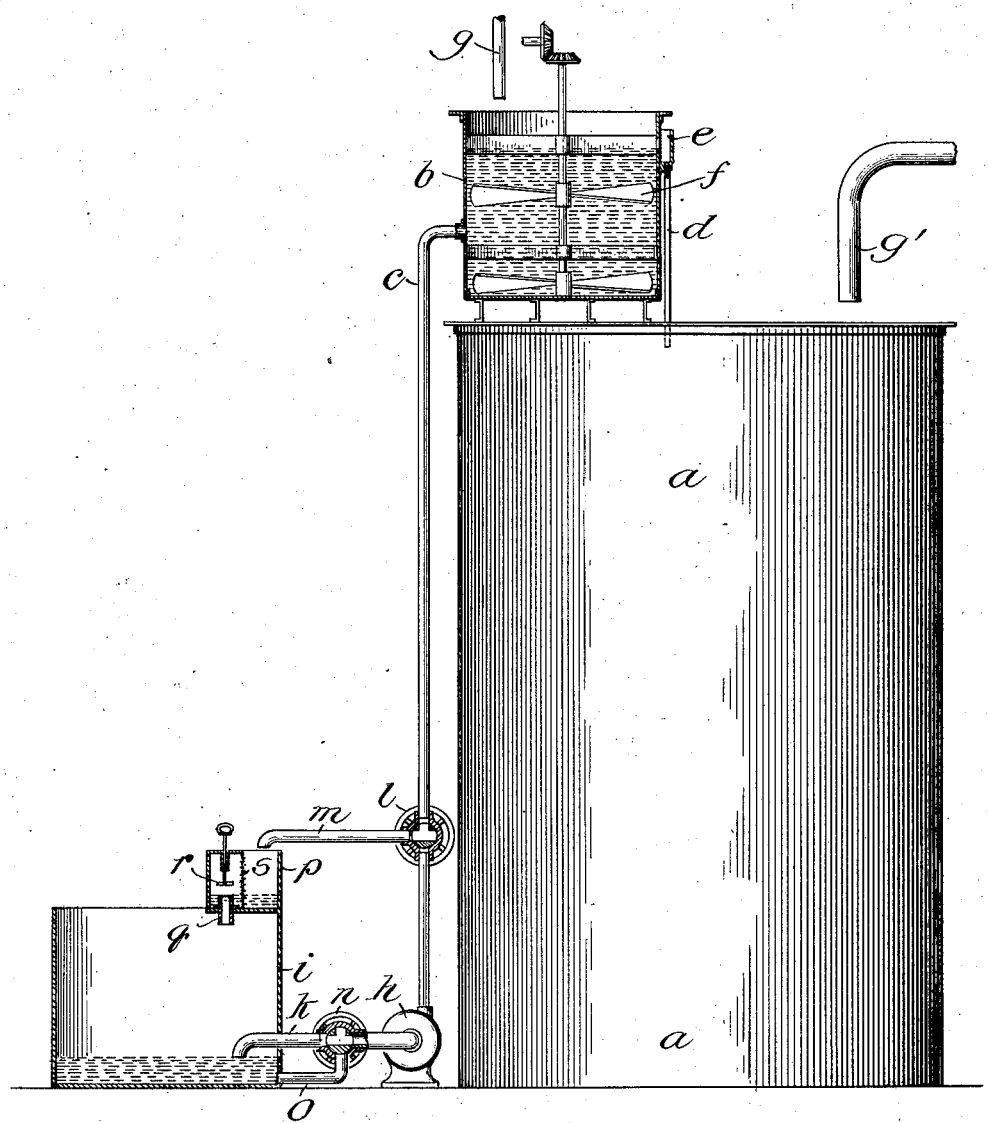
Witnesses
Inventor
Kent W. Bartlett

UNITED STATES PATENT OFFICE.

KENT W. BARTLETT, OF CHICAGO, ILLINOIS.

LIQUID-TREATING APPARATUS.

1,011,399. Specification of Letters Patent. Patented Dec. 12, 1911.

Application filed June 27, 1910. Serial No. 568,983.

*To all whom it may concern:*

Be it known that I, KENT W. BARTLETT, citizen of the United States, residing at Chicago, in the county of Cook and State of Illinois, have invented a certain new and useful Improvement in Liquid-Treating Apparatus, of which the following is a full, clear, concise, and exact description, reference being had to the accompanying drawings, forming a part of this specification.

My invention relates to apparatus for preparing chemicals in liquid form and is of particular service in connection with liquid treating or water softening apparatus.

I will explain my invention by reference to the accompanying drawing showing the preferred embodiment thereof as employed in connection with water softening apparatus, the drawing illustrating a settling tank, a chemical reservoir upon the top of the tank for supplying chemical to the tank, and chemical mixing apparatus at the bottom of the tank.

The settling tank $a$ may be of any well known or suitable form and serves as a support for a chemical supply tank $b$ in which the chemical is received through a pipe $c$, after said chemical has been suitably prepared, and from which it is discharged into the settling tank through a pipe $d$ that is in communication with an overflow opening $e$ in the chemical tank. Suitable agitating mechanism $f$, forming one part of my present invention, is contained within the chemical tank for keeping the chemical solution uniformly mixed. In the apparatus illustrated, chemical is admitted to the settling tank as the treated liquid in the settling tank is withdrawn, the chemical being fed from the chemical tank to the settling tank by being displaced from the chemical tank by water flowing through the pipe $g$ at a rate which increases as the strength of the chemical decreases, thereby to increase the volume of chemical flowing into the settling tank to compensate for the diminution in the strength of said chemical. I, however, do not limit myself to the method in which the prepared chemical is supplied to the settling tank, as my present invention relates to the preparation of the chemical rather than to its distribution after preparation.

The water flows through the pipe $g$ in increasing proportion to the water that is to be treated which flows through the pipe $g'$ into the settling tank. The prepared chemical is supplied to the chemical tank through the riser or pipe $c$ by means of a pump $h$ that transfers the prepared chemical from a preparing tank $i$ through a pipe $k$, communicating with the interior of said preparing tank, to the riser $c$. A valve, such as the valve $l$, is adapted to prevent the return of the chemical from the chemical tank through the pipe $c$. When the chemical in the chemical tank has become weakened to its minimum limit, it is withdrawn in sufficient quantity therefrom and is admitted to the preparing tank, preferably through the same pipe $c$ that conveys the prepared chemical to the chemical tank, and in order that the weakened chemical may thus be supplied to the preparing tank, the valve $l$ is adjusted so as to throw the portion of the pipe $c$ above it into connection with a pipe $m$ that discharges into the preparing tank $i$. In order that chemical within the chemical tank $b$ may be available for passage into the preparing tank, the pipe or duct through which the chemical is conveyed into the preparing tank communicates with the chemical tank below its upper limiting level. When an amount of chemical from the chemical tank $b$ suited to the amount of dry chemical directly placed in the preparing tank $i$ has been admitted to said preparing tank, then the valve $l$ is turned so as to stop the flow of chemical from the chemical tank toward the preparing tank, whereafter the material within the preparing tank is intermixed, as by means of agitation manually effected. I have specified the admission of weakened chemical solution from the chemical tank to the preparing tank as a step in the preparation of a new supply of chemical, but I do not wish to be limited to the use of weakened chemical. After the mixture has been prepared in the preparing tank, the valves $l$ and $n$ should have an adjustment whereby the pipe $c$ is thrown into communication with the interior of the preparing tank by way of the pump $h$ and the pipe $k$, said pump then being operated in order to force the prepared chemical from the preparing tank into the chemical tank, this chemical being supplied to the chemical tank $b$, in the embodiment of the invention illustrated, until it reaches its upper limiting level. In the embodiment of the invention illustrated, one important advantage is that the amount of liquid supplied from the chemical tank $b$ to the preparing tank $i$ is substantially the amount of liquid that is returned to the chemical tank from the preparing tank, the very slight excess in volume of the returned liquid, which excess is due to the solid chemical, being so small as to be negligible.

In accordance with another feature of my invention, I do not withdraw all of the chemical from the preparing tank but permit a residue to remain which may be used, for example, in slaking lime, and when this feature of my invention is included in the apparatus, the intake end of the pipe $k$ is located a distance above the bottom of the preparing tank that will permit of the retention of the desired residue of prepared chemical. A pipe $o$ communicates with the interior of the preparing tank very close to its bottom and may be thrown into communication with a slaking chamber $p$ by means of a suitable adjustment of the valves $l$ and $n$, the pump $h$ then being employed to transfer as much of the residue as desired to the slaking chamber $p$, this desired proportion of the residue of the prepared chemical flowing through the pipe $o$, the valve $n$, the pump $h$, the valve $l$, and the pipe $m$, the slaking chamber $p$ being interposed between the pipe $m$ and the tank $i$. In order that a residue of the chemical may be retained in the slaking chamber $p$, I cause the pipe $q$ that affords the passage between the slaking chamber and the preparing chamber to project a suitable distance above the bottom of the slaking chamber, though I do not wish to be limited in all embodiments of my invention to the projection of the pipe $q$ toward the bottom of the slaking chamber. During the slaking operation, communication between the slaking chamber and the preparing chamber is cut off by means of a valve $r$. After the slaking operation has been completed, the valve $r$ is opened so that the slaked or hydrated chemical may be admitted to the preparing tank $i$, whereafter the desired amount of chemical is admitted to the preparing tank from the chemical tank $b$ in the manner and for the purpose which has been described. In order to prevent the passage of larger particles of dry chemical from the slaking chamber, a screen $s$ may be employed.

While I have herein shown and particularly described the preferred embodiment of my invention, I do not wish to be limited to the precise details of construction shown, as changes may readily be made without departing from the spirit of the invention, but,

Having thus described my invention, I claim as new and desire to secure by Letters Patent the following:—

1. Apparatus for treating liquid, including a chemical tank from which chemical is to be supplied for the treatment of liquid; a chemical preparing tank; a slaking chamber communicating with the interior of said preparing tank in order that chemical may pass from the slaking chamber to said preparing tank; and means for conveying chemical from the preparing tank to the chemical tank and to the slaking chamber.

2. Apparatus for preparing chemical, including a tank; a slaking chamber communicating with the interior of said tank in order that the chemical may pass from the slaking chamber to said tank, the orifice through which the chemical is discharged from the slaking chamber to said tank being located above the level of the bottom of the slaking chamber; and means for passing chemical from the tank to the slaking chamber.

3. Apparatus for preparing chemical, including a tank; a slaking chamber communicating with the interior of said tank in order that the chemical may pass from the slaking chamber to said tank, the orifice through which the chemical is discharged from the slaking chamber to said tank being located above the level of the bottom of the slaking chamber; means for passing chemical from the tank to the slaking chamber; and a valve structure for preventing and permitting communication between the slaking chamber and tank.

4. Apparatus of the class described, including a chemical tank $b$; a preparing tank $i$; a slaking chamber $p$; a pipe $c$ affording communication between said tanks; a pipe $m$ affording communication between said pipe $c$ and the slaking chamber; and a valve $l$ for cutting off direct communication between said tanks and bringing about direct communication between the pipe $m$ and the chemical tank.

5. Apparatus of the class described, including a chemical tank $b$; a preparing tank $i$; a slaking chamber $p$; a pipe $c$ affording communication between said tanks; a pipe $m$ affording communication between said pipe $c$ and the slaking chamber; a valve $l$ for cutting off direct communication between said tanks and bringing about direct communication between the pipe $m$ and the chemical tank; and means for effecting the passage of chemical from the preparing tank to the chemical tank.

In witness whereof, I hereunto subscribe my name this 24th day of June, A. D., 1910.

KENT W. BARTLETT.

Witnesses:
G. L. CRAGG,
R. E. ATHERTON.